Patented Sept. 23, 1924.

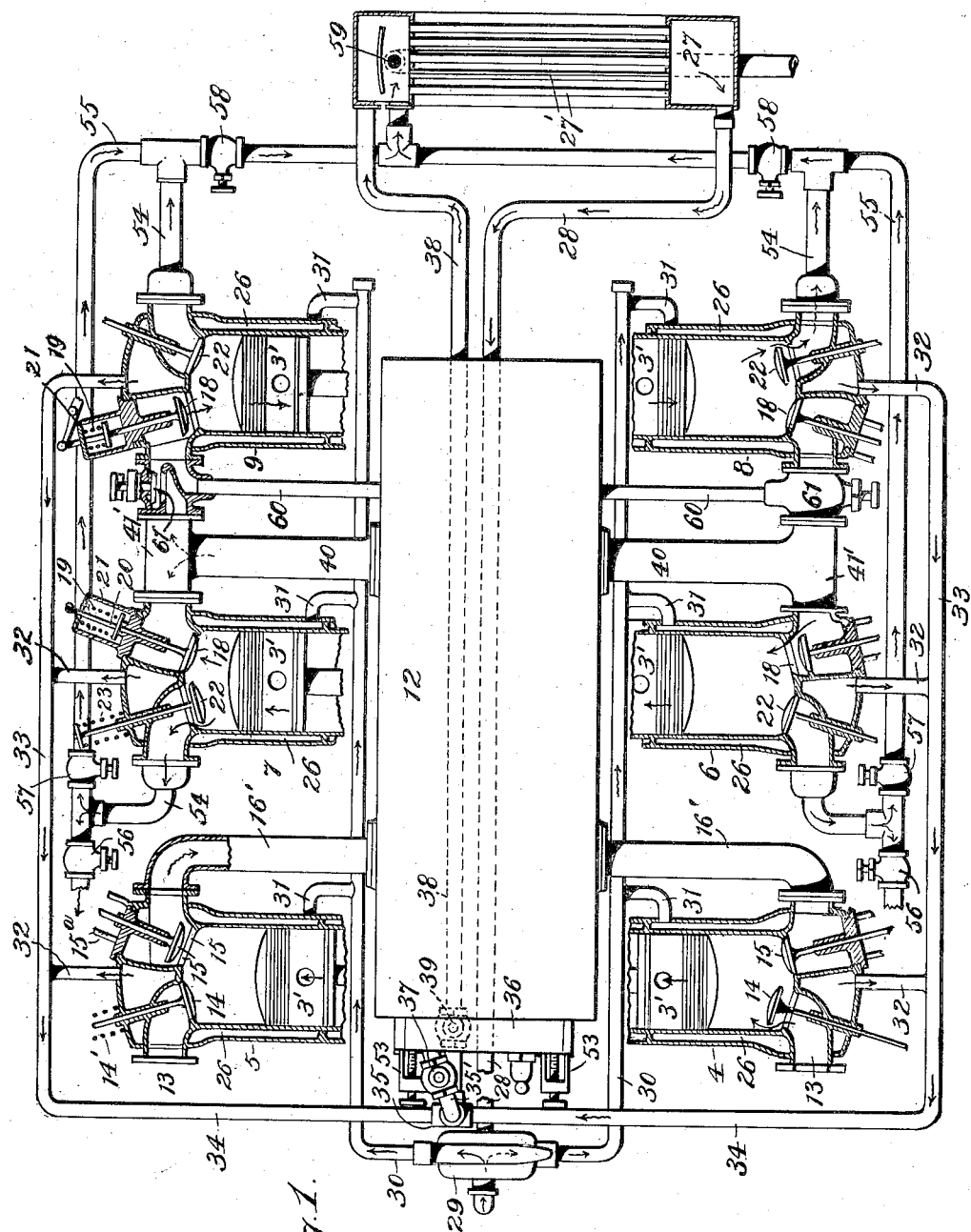

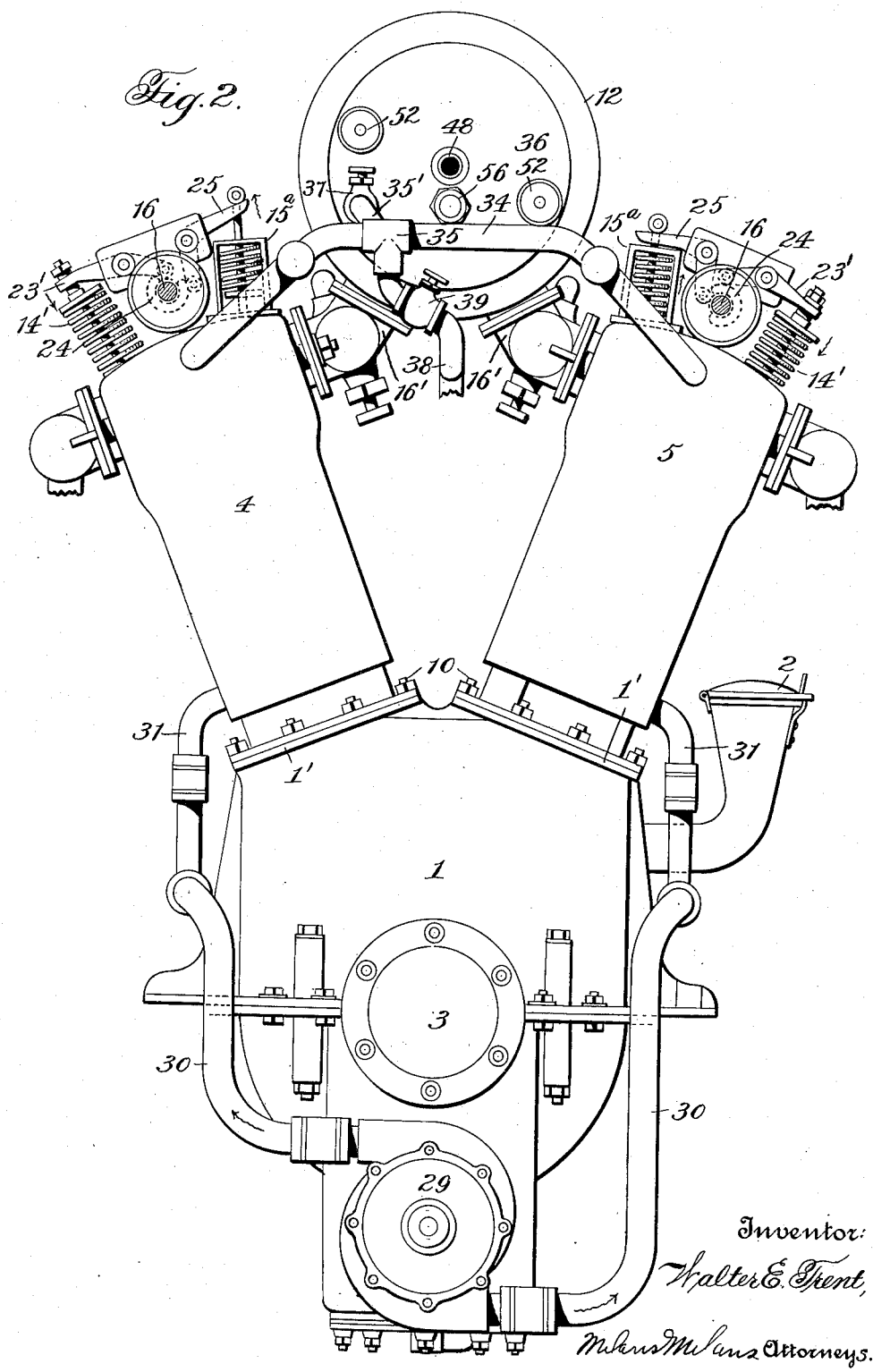

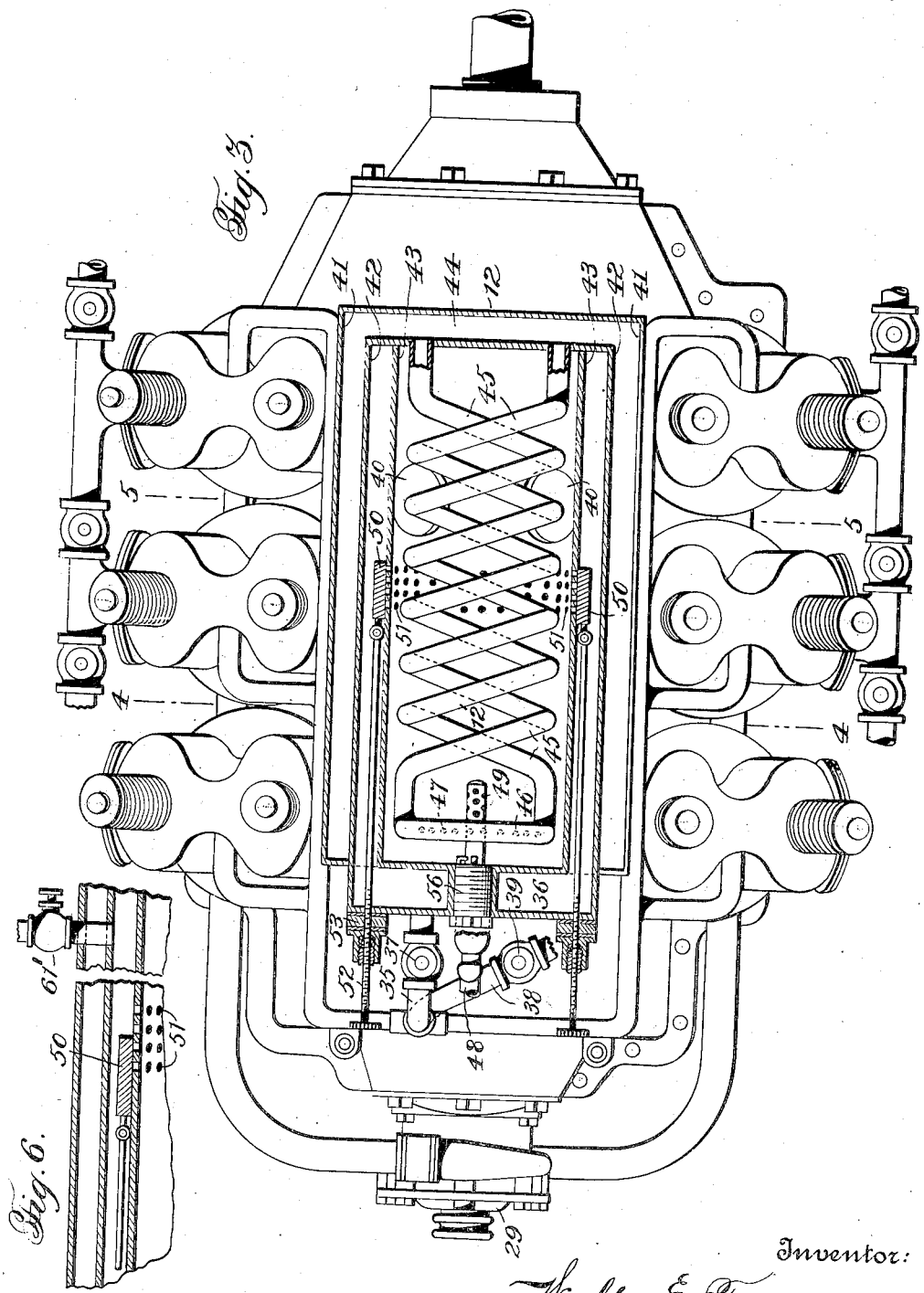

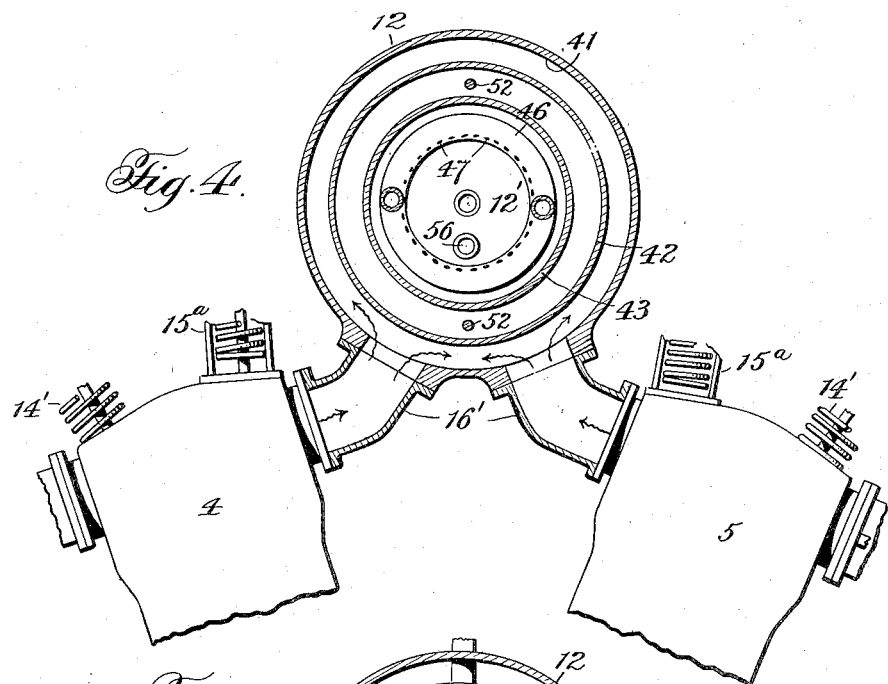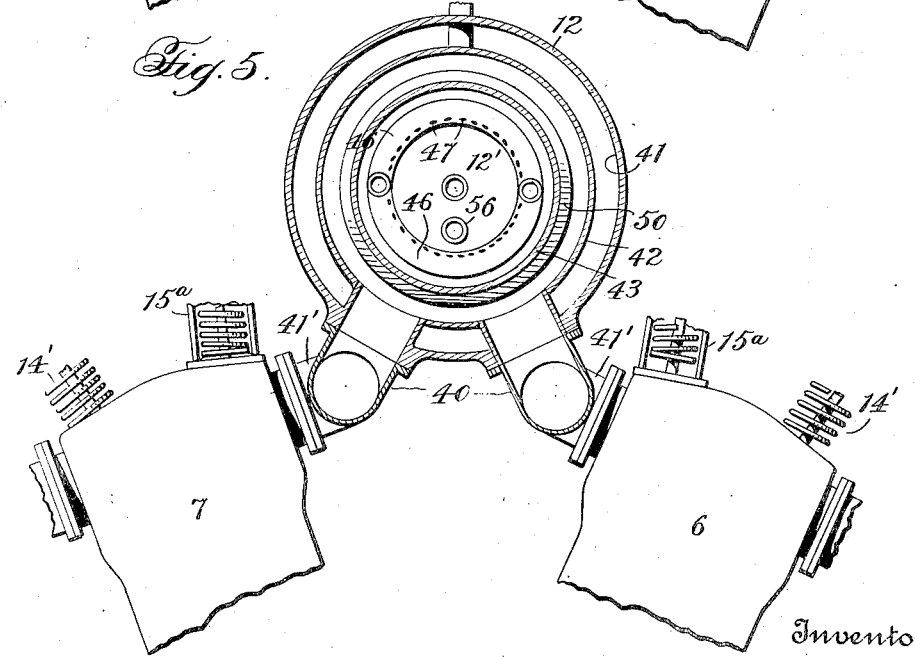

1,509,622

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION, OF WASHINGTON, DISTRICT OF COLUMBIA, A CORPORATION OF DELAWARE.

POWER PLANT.

Application filed April 17, 1919. Serial No. 290,797.

*To all whom it may concern:*

Be it known that I, WALTER E. TRENT, a citizen of the United States, residing at Washington, in the District of Columbia, have invented certain new and useful Improvements in Power Plants, of which the following is a specification, reference being had therein to the accompanying drawing.

The invention relates to improvements in power plants of the continuous combustion type, and deals more particularly with the general class of plant disclosed in my co-pending applications Serial Nos. 284587 and 284588 filed March 24, 1919.

In this class of plants or systems it has heretofore been the practice to employ a generator that receives a volume of water to be subjected to the action of gaseous products of combustion producing at all time a composite energy of steam and gaseous products adapted to be thoroughly intermixed and used together as a composite energy for cylinder expansion. While this type of plant possesses favorable and reliable operating characteristics, and from a standpoint of thermal efficiency and reliability is vastly superior to either the steam or combustion system, it has been found that under certain conditions of operation it is more desirable to utilize a fluid energy of a single character for cylinder expansion, or separated and different forms of fluid energies, such for instance as steam and gaseous products of combustion to be separately expanded in different cylinders, than a composite mixture of steam and gaseous products which is the form of energy that is constantly produced in the prior art devices without any possible variations.

The present invention, therefore, aims to provide a plant having a generator which is constructed so as to continuously produce if necessary a composite energy of steam and gaseous products of combustion to be used together for cylinder expansion which is preferable under most conditions, or an energy of a single character for cylinder expansion as well as independent motive fluids of different characters to be separately expanded in suitable engine cylinders, the nature or character of the expansive fluid used, of course, depending upon the conditions or requirements under which the plant is operated, it being understood that to secure a highly favorable operation of the plant which is desirable under various working conditions to introduce to the engine cylinders fluid energies of different and controlled characters.

It is a further object of the invention to provide a generator of a unit construction consisting of a minimum number of parts, simple and efficient in operation, yet light in weight in proportion to the power developed and capable of being readily applied to any type of engine.

In a preferred embodiment the plant consists of a plurality of cylinders naving the usual water jackets therearound in communication with the water circulating system, in combination with a generator adapted to be supported adjacent the cylinders receiving compressed air from one cylinder acting as a compressor, while a second cylinder constitutes the power cylinder receiving and expanding the energy produced in the generator. To conserve and utilize for power purposes substantially all of the heat of the fuel, the water passing through the cylinder jackets of course absorbs the heat radiating through the cylinder walls and instead of returning the water directly to the radiator for cooling it may be introduced to the generator in its highly heated condition to be subjected to the heat of combustion in the combustion chamber or directly to the action of the products of combustion producing an energy to be expanded in the power cylinders, it being understood that the water prior to its admission to the generator has absorbed not only the heat radiating from the power cylinders, but also the heat of compression developed in the compression cylinder delivering air to the combustion chamber.

It is a further object of the invention to provide a generator having an air conducting pipe or conduit through which the compressed air travels leading from a suitable air reservoir directly through the entire zone of combustion in the combustion chamber to be subjected to the heat of combustion thereby intensely heating the air prior to its discharge into the fuel introduced to the combustion chamber and serving to materially increase the efficiency of the generator.

In a more specific embodiment the invention consists of a power plant comprising a generator of a unitary construction adapted to be applied to a multi-cylinder engine, receiving compressed air from one or more cylinders of the engine and a supply of preheated water that has passed through the engine jackets, the water and air being usually used in conjunction with a suitable fuel in the generation of a fluid energy. The generator is constructed with valves controlling the flow of water introduced thereto so that if desired a composite energy of a regulated quantity of steam and gaseous products of combustion may be produced and expanded in all of the power cylinders, or the plant may be operated as a strictly combustion system by shutting off the supply of water to the generator and sending the same directly to the radiator, thus causing the production of products of combustion alone in the combustion chamber. Then again, in order to successfully operate under variable conditions, fluids of a different character may be produced and introducted to separate cylinders for independent expansion, in which instance it will be manifest that one cylinder will receive gaseous products of combustion alone from the combustion chamber while another cylinder will receive steam generated from the water introduced to the generator by heat absorbed by the water during its passage through the water jackets of the cylinders and the heat from the combustion chamber that is surrounded by the water jacket. It will also be understood that by a suitable manipulation of controlling valves gaseous products with an intermixed predetermined portion of steam may be generated and introduced to one or more cylinders, and an energy of live steam alone produced in the water jacket of the generator surrounding the combustion chamber and transferred to another cylinder, it being an object of the invention to construct the generator so that by appropriate adjustment of suitable valves it will produce an energy of products of combustion alone, or a composite energy of gases and steam and any combination between these two depending upon the operating conditions encountered.

In the accompanying drawings I have illustrated a single embodiment of the invention wherein the generator is disclosed as being applied to an engine of the radiating cylinder type, but I wish it to be clearly understood that this disclosure is only made for the purpose of illustration, and not for limitation and the invention is capable of many changes in construction and arrangement of parts and embodiments in many forms.

In the drawings:

Figure 1 is a diagrammatical view with parts shown in section.

Figure 2 is a side elevation.

Figure 3 is a top plan view with parts of the generator broken away.

Figures 4 and 5 are sectional views on lines 4—4 and 5—5 of Figure 3.

Figure 6 is a detail view of the fluid controlling valve.

Referring now more particularly to the drawings wherein like reference characters indicate corresponding parts, the numeral 1 designates an engine, which for the purpose of illustration is shown as one of the radiating cylinder type having the cylinders mounted upon the crank case 1', six cylinders being shown in this embodiment of the invention, although it will be clearly understood that any number of cylinders may be employed, or that any type of engine can be used without departing from the invention. The crank case of the engine has the usual oil feed 2 and is provided with the crank shaft 3 to which the engine pistons 3' reciprocating within the cylinders 4, 5, 6, 7, 8 and 9 are connected. These cylinders are mounted upon the crank case by the bolts 10 having suitable nuts and securing the flanged ends of the cylinders upon the engine crank case.

The cylinders 4 and 5 constitute compression cylinders, receiving air upon a down stroke of the pistons therein through the air inlet passages 13 that are normally open and communicate with the atmosphere, these passages being controlled by the valves 14 that have disposed therearound valve springs 14' normally tending to seat the valves. The cylinders 4 and 5 also have the outlet ports 15 controlled by the outlet valves 15', which are also normally held closed by suitable springs mounted within the valve cages 15$^a$ and are adapted to be depressed by the rocker arms connected with the cam shaft 3 of the engine. It will, of course, be understood that the inlet valves 14 and the exhaust valves 15' are properly timed so as to open and close at stated intervals to permit the introduction and discharge of compressed air from the compression cylinders 4 and 5 into the air conveying pipes 16' leading directly to a generator 12 which is adapted to be positioned between the radiating cylinders and produce an energy in a manner which will later appear, it being understood that compressed air is constantly delivered to the generator from the air compressors 4 and 5.

The cylinders 6, 7, 8 and 9 in the present disclosure constitute power cylinders and each cylinder is provided with an inlet valve 18 adapted to open outwardly from the valve seats and normally held closed by the valve springs 19 surrounding the valve stems 20 and positioned within the valve cages 21 mounted upon the tops of the cylinders. These inlet valves open outwardly, as distinguished from the usual inlet valves opening inwardly in view of the fact that the power cylinders do not generate the expansive charge therein, but the expansive charge introduced to said cylinders is generated within the generator 12 and the pressure of the charge is exerted upon the outer face of the valves serving to assist the springs 19 in normally maintaining these valves closed. The power cylinders are also provided with the usual exhaust valves 22 having suitable springs 23 for maintaining the same closed, these valves opening inwardly and actuated by the rocker arms 23' operated by the cams 24 of the cam shaft 16. Each cam shaft is, of course, driven by the crank shaft of the engine through any suitable gearing. The inlet valves 18 are likewise opened and closed at the proper periods by the cranks 25, which are of substantially bell crank formation and likewise cooperate with the cams 24 of the cam shaft 16, it being apparent that these valves are timed so as to open and close when the pistons have reached their proper positions to permit the introduction and discharge of the expansive mixture.

The cylinders are adapted to receive energies of variable degrees of heat, ranging from a low temperature, about that of saturated steam, up to the high temperatures that are attained in the use of the usual internal combustion system, and these cylinders are, therefore, provided with water jackets 26 extending therearound into which a supply of water is introduced to prevent the destroying of the lubricating film within the cylinders and to serve to cool the cylinder and oil when an expansive charge of a very high temperature is employed. As a means for introducing water to the water jackets 26 a suitable radiator 27 is employed which may be positioned in any place desired and shown as having the vertical cooling tubes 27' extending from upper and lower headers. From the lower header of the radiator the pipe 28 extends rearwardly to a suitable pressure pump 29 driven from the crank shaft and serving to force the water introduced thereto through the pipe 28 outwardly through the water conveying pipes 30 leading from each side of the pump lengthwise of the cylinders and provided with branch connections 31, each branch communicating with the lower portion of the cylinder water jacket. It might here be stated that instead of introducing a supply of water to each cylinder through a separate jacket leading from the main supply pipes 30, the water could if desirable be passed successively through the different cylinder jackets, first entering the jackets of the air compressor cylinders 4 and 5 and thence passing on through the jackets of the power cylinders. It will be manifest that only a sufficient quantity of water is introduced to the jackets to cool the inner skin of the power cylinders to permit lubrication but not to cool the core of the expansible gases therein, and the heat radiating from these cylinders is, of course, absorbed in the water as well as the heat of compression produced in the cylinders 4 and 5. It will be understood that if extremely hot gases are being expanded in the power cylinders then, of course, a greater percentage of heat will be absorbed in the water in the jackets surrounding the cylinders than if a cooler gas is being expanded.

The water from the various jackets 26 is discharged through the discharge conduits 32 leading from the top of each jacket and communicating with the main discharge conduits 33 extending lengthwise of the cylinders and terminating in a cross header 34 as clearly shown in Figure 2, bridging the two rows of parallel cylinders. This header 34 is provided with a two-way coupling 35 in the horizontal plane of the end of the generator 12, the coupling being connected with a pipe 35' leading to the water chamber 36 of the generator 12. The water feeding pipe 35' has arranged therein a controlling valve 37, of any well known construction, the purpose of the valve being to vary the quantity of water entering the chamber 36 from the circulating system, or entirely shutting off the supply of water to the chamber. A return circulating pipe 38 leads from the two-way coupling 35 extending lengthwise of the cylinders and entering the upper header of the radiator 27 to permit the return of the heated water to the radiator for cooling when this is desirable. This return pipe 38 has a controlling valve 39 therein, adjacent the rear end of the engine and in close proximity to the valve 37, so that by closing the valve 39 and opening the valve 37 all of the heated water passing from the water jackets is permitted to directly enter the water chamber 36 of the generator 12, it being obvious that upon a reverse manipulation of these valves the water will be shut off from entering the chamber 36 and caused to pass directly to the radiator 27 without entering the water chamber of the generator. The heated water from the water jackets 26 may be, or may not be utilized in the generator in the production of a power fluid that is expanded in the power cylinders, and it is for this purpose that the valves controlling the passage of water thereto are provided, the manner in which the energy is produced upon the introduction of the water to the generator is to be more fully hereinafter described. It will be understood that the engine and circulating system herein disclosed and described is merely shown for the purpose of illustrating a convenient form of engine to which the generator is attached, and it will be understood that any type of engine can be easily employed for use in conjunction with the generator without departing from the spirit of the invention.

The generator 12 is provided with the combustion chamber 12' extending the entire length thereof to permit a complete combustion or burning of the mixture introduced thereto, and is of sufficient strength to resist the pressure created therein during the operation of the generator. The generator is shown as being supported upon the air delivering pipes 16' leading from the air compressor cylinders, and also by the conduits 40 connected with the power inlet manifolds communicating with the power cylinders. The generator is preferably formed with a plurality of separated walls 41, 42 and 43, spaced apart an equal distance thereby forming the water chamber 36 and the air chamber 44, both of these chambers extending the entire length of the generator, while the air chamber extends across one end thereof and the water chamber across the other. These chambers may be of any capacity or construction desirable, but the most approved form of chamber is herein shown.

The air delivered to the generator from the air compressor cylinders 4 and 5 enters the air chamber 44 through the air conducting pipe 16' and is directly discharged therein, the air traveling around the heated wall 42 of the generator and absorbing any heat that may escape or radiate from the combustion chamber 12'. The air passes around the generator being introduced near one end thereof and at the opposite end of the air jacket there are provided a pair of air conducting pipes 45 shown as extending spirally directly through the combustion chamber 12' for substantially its entire length, the pipes leading to the common circular discharge nozzle 46 having a plurality of jet openings 47 discharging the air toward the center of the combustion chamber 12' where it completely intermixes with a suitable fuel, preferably oil, entering the combustion chamber through the pipe 48 and sprayed through the spray openings 49 outwardly toward the walls of the generator. It will be observed that the air introduced to the generator is materially heated by the heat radiating from the combustion chamber, but this air is additionally heated to an intense temperature by its passage through the spiral pipes 45 directly through the zone of combustion being subjected at all times to the heated products of combustion prior to its discharge through the jet openings 47. The oil or other fuel entering the combustion chamber through the pipe 48 completely intermixes with the intensely heated air, it being here observed that the oil and air are sprayed in opposite directions so as to cause an intimate association or mixture of the oil and air thereby forming a highly combustible mixture burning in the combustion chamber 12', the combustion chamber being of sufficient length to give the mixture ample time to be entirely consumed before the pressure gases generated are utilized in the power cylinder. The air conducting pipes 45 are shown as being of a spiral formation, but this is merely disclosed as a preferred construction for amply heating the air passing through the combustion chamber by increasing its distance of travel during the time it is under the influence of the heat of the products of combustion but obviously straight conveying pipes or any other suitable pipes leading from the air jacket 44 can be used with good results.

The water from the circulating system entering the water chamber 36 through the pipe 35 when the valve 37 is opened is, of course, preheated prior to its arrival to the chamber by the absorption of the heat of the gases from the power cylinders 6, 7, 8 and 9 and the heat of compression from the compression cylinders 4 and 5. This water, however, when it enters the water chamber 36 which directly surrounds the combustion chamber 12' is additionally heated to a very high degree, producing live steam from the heat thus absorbed, and as a convenient means for permitting the introduction of a regulated quantity of water to the combustion chamber 12', or preventing the introduction of any water thereto, a slide valve 50 disposed within the water chamber and of circular formation of a width sufficient to cover all of the spray jets 51 extending through the inner wall 43 of the generator. This valve is manipulated or adjusted by the valve operating stems 52 accessible from the rear of the generator and passing through threaded members 53 so that upon a rotation of the rods 52 the valve is moved in the desired direction whereby the jets 51 may be uncovered to permit the discharge of the saturated steam from the chamber 36 into the combustion chamber 12' at a point at which combustion has been completed, shown substantially intermediate the length of said chamber to be subjected to the action of the products of combustion in said chamber, the saturated steam absorbing a portion of the heat of these products causing the generation of a live steam that is to be used with said products as a composite energy for expansion in the power cylinders 5, 6, 7 and 8. Obviously the opening of a regulated number of the spray jets 51 controls the volume of fluid that is permitted to enter the combustion chamber, so that the mixture or energy produced therein is of a variable regulated temperature and the proportions of steam and gaseous products likewise variable relative to each other.

The combustion chamber has leading therefrom the energy conducting pipes 40 by which the generated pressure gases are delivered to the power cylinders 6, 7, 8 and 9 through the manifolds 41' leading to the inlet valves 18 of the cylinders, it being observed that these valves open outwardly instead of inwardly as is the customary practice by reason of the fact that the pressure gases in the manifold 41' serve in conjunction with the springs 19 to maintain the valves closed until they are opened by the positive engagement of the rocker arms 20 cooperating with the cams 24 of the cam shaft 16. The pressure of the gases exerted upon the outer faces of the inlet valves 18 is greater than the pressure of the expanding gases in the cylinder, and it is therefore desirable that these valves open outwardly instead of inwardly to prevent the opening of the valves at improper periods. The power cylinders exhaust through the exhaust ports 54 upon the opening of the exhaust valves 22 which are depressed against the springs 23 upon a movement of the rocker arms 23' driven by the cam shaft 16. When the production of pressure gases in the generator is to begin, and when the combustion chamber is cold, combustion is initially produced by the firing of the spark plug 56 passing through the rear wall of the generator and connected with a battery or any other source of electrical energy, so that upon the manipulation of a switch in the introduction of oil and air to the generator combustion of the mixture takes place, and the spark plug is permitted to continue firing until the temperature of the combustion chamber has been raised to a sufficient degree to support combustion without the aid of the spark plug, at this time the switch being manipulated to close the circuit leading to the plug.

While the plant will operate with an extremely high efficiency upon a mixture of steam and gaseous products of combustion being introduced to the engine cylinders from the generator it has nevertheless been found that under certain conditions it is more desirable to introduce to the power cylinders an energy of gaseous products alone thereby shunting the generator from the water circulating system so that no separation of gases from the steam when the same is introduced to the radiator 27 is necessary. To successfully meet various conditions it is also frequently desirable to produce an energy in the generator of different separated characters, such for instance as steam produced in the water jacket 36 by heat radiating from the combustion chamber 12' and products of combustion formed by the burning of the combustible mixture in the generator which energies are separately introduced and expanded in different cylinders, in this instance the exhaust gases or products of combustion being discharged to the atmosphere while the independently expansive steam is conveyed to the radiator and condensed and the water of the steam recovered, thus eliminating the separation of the gaseous products of combustion from the steam in the generator. It has been found that it may also be desirable, this of course depending upon the operating conditions encountered to utilize an energy of combined steam and gaseous products of combustion in certain cylinders, and an energy of steam alone in other cylinders, which may be accomplished in the present generator by slightly shifting the fluid control valve 50 to permit a limited amount of steam to enter the combustion chamber 12' while permitting the surplus steam generated in the water chamber 36 to pass on to other cylinders for independent expansion. It will, therefore, be seen that the invention aims to provide a plant which can be run on combustion gases alone, which will obviously be of a high temperature and a plant similar to the internal combustion system, or as a plant utilizing for cylinder expansion a composite energy of steam and gaseous products of combustion in regulated volumes, or any combination between these extremes in keeping with the conditions surrounding the use of the plant.

With this conception in mind the preferred embodiment of the invention comprises the generator 12 adapted to receive its source of water from the circulating system through the pipe 35 controlled by the valve 37 after it has passed through the water jackets of the cylinders, which water is permitted to enter the combustion chamber in a regulated spray formed upon the manipulation of the valve 50, or its passage to the combustion chamber is prevented and steam is generated directly in the water chamber 36 by heat radiating from the combustion chamber 12'. Assuming that the generator is to be set to produce a mixture or energy of gaseous products and steam upon which all of the cylinders are to operate, then the valve 37 is opened and the valve 39 closed, while the valve 50 is likewise opened to permit the flow of the fluid into the combustion chamber 12. This fluid is subjected to the action of products of combustion absorbing some of the heat of the products and adapted to be used with said products as an energy, passing from the generator through the pipes 40 into the manifolds 41 from where it is delivered to the power cylinders 6, 7, 8 and 9 upon the opening of the inlet valves 18 by the rocker arms 20, being expanded in the cylinders to generate power. The energy after being spent in the cylinders in the development of power is exhausted therefrom by the opening of the valves 22 upon the actuation of their rocker arms 23', and this mixture of gaseous products of combustion and steam is preferably then admitted through the pipes 54 into the return pipes 55 leading to the upper header of the radiator 27. When the exhaust is being introduced to the radiator the valves 56 in the pipes 55 are closed and the valves 57 and 58 in these pipes opened to permit the free passage of the fluid to the radiator. at which point the steam is condensed and the gases allowed to pass from the radiator through the gas exits 59 extending from the upper header down along the sides of the radiator to discharge into the atmosphere, the controlling valves above described being clearly shown in the diagrammatic view disclosed in Figure 1.

Should the occasion arise that the engine will operate more favorably when energies of different characters are being spearately expanded in the cylinders, then the slide valve 50 is usually adjusted to close all, or practically all of the spray openings 51, it being apparent that gaseous products of combustion are being produced at this time in the generator while live steam is forming in the water chamber 36. When operating in this manner the steam delivering pipes 60 having the controlling valves 61 that are closed when the generator is producing a combined mixture of steam and gases for cylinder expansion together, are now opened, the steam passing through these pipes and directly into the cylinders that are expanding the same, being shown in Figure 1 as the two right hand cylinders, the admission of the steam to the cylinders being controlled by the inlet valves 18 in the same manner as heretofore described when dealing with the introduction of the mixture of steam and products to all of the cylinders. However, when steam alone is to be used in one or more of the cylinders, then suitable valves arranged on one side of the manifolds 54 and indicated by the reference characters 61 are actuated to close the communication between the manifolds 54 and these cylinders, so that no energy can enter the cylinders save through the steam conducting pipes 60, it being here apparent that these valves 61 are manually operated so as to be opened or closed at the will of the operator. It will therefore, be seen that steam is entering a certain number of the cylinders for independent expansion from the steam or water jacket 36 and gaseous products of combustion are entering other cylinders through the conducting pipes 40 and manifolds 41' to deliver pressure gases to these cylinders for independent expansion. In instances where different cylinders are separately expanding different fluids it is desirable to only return the steam exhausted from the steam cylinders to the radiator 27 and to discharge the exhaust products of combustion directly into the atmosphere, and to accomplish this it is only necessary to open the valves 56 and 58 in the return pipes 55 leading to the radiator and close the valves 57 located adjacent the point where the exhaust is delivered to the pipes 55 from the cylinders that have been expanding products of combustion, and these exhausted products are then allowed to escape to the atmosphere, while the steam is compelled to return to the radiator where it is condensed and converted into water for further use in the system.

It will, therefore, be seen that upon the operation of the various valves, including the valves 37 and 39, controlling the admission of the fluid to the water chamber 36 of the generator it is possible to operate the plant as a strictly internal combustion system at which time the water is sent directly to the radiator through the return pipe 38 and the generator shunted thereby producing in the generator only products of combustion to be expanded in the cylinders, upon admitting water from the circulating system to the water chamber through the pipe 35 upon the opening of the valve 37 and closing of the valve 39 steam and gaseous products of combustion may be produced separately for independent cylinder expansion, or a composite mixture of steam and gaseous products alone generated in the combustion chamber 12', this, of course, being accomplished by adjusting the valve 50 so as to uncover a determined number of the spray openings 51 and allowing the introduction of the fluid to the combustion chamber to be subjected to the action of the products of combustion after their generation, thereby producing a composite energy to be conveyed through the pipes 40 to all of the power cylinders for expansion. Then again, when the water from the circulating system is allowed to enter the water chamber 36 it may be preferable to use for cylinder expansion energies of different characters, such for instance as energy of steam and gaseous products of combustion of the regulated temperature for expansion as a composite energy in certain cylinders, and an energy of steam alone for independent expansion in other cylinders. In the present plant this may be done by slightly opening the valve 50 in the water chamber 36 allowing a determined quantity of steam to enter the combustion chamber 12' to be subjected to the action of the gases therein producing a composite energy of steam and gases to be carried to the intermediate cylinders shown in Figure 1 through the pipes 40 into the cylinders 6 and 7. It will be understood that when operating in this character the manually controlled valve 61 will be closed to prevent the admission of steam and gaseous products of combustion to the cylinders 8 and 9, and the valve 61' in the steam pipe 60 by which the surplus steam from the chamber 36 is carried to the cylinders 8 and 9 is opened, so that this steam enters the cylinders alone and is expanded therein, the exhausting of the cylinders taking place in the manner hereinbefore described.

From the foregoing it will be seen that the present plant is capable of operation as a system for utilizing gaseous products alone for cylinder expansion, or producing and expanding a composite energy of steam and gaseous products, or as a matter of fact any preferred combination between these two. It will also be seen that all of the heat of the fuel is utilized in the development of power and that little or no heat is dissipated when the plant has run under any of the principles herein described. The heat absorbed in the water passing through the water jackets and ordinarily lost is utilized in the present plant serving to preheat this water that generally is very hot after absorbing heat radiated through the cylinder-walls and is then additionally heated in the generator by heat taken from the gaseous products of combustion which usually is ultimately used in the generation of the steam to be expanded alone, or with gaseous products of combustion and the heat of compression from the compression cylinders is likewise conserved and stored in the water so that little or no heat that should be spent for power purposes is dissipated. It will be understood that the expansive energy whether the gaseous products of combustion, a composite energy of steam and products or separated energies of steam and gaseous products are continuously generated so that the operation of the plant is continuous in every respect and an expansive charge is introduced to the power cylinders 6, 7, 8 and 9 upon every stroke thereof, as distinguished from the usual type of engine wherein every other stroke of the piston is a power stroke.

By designating the energies produced as being energies of different characters, it is meant that one energy may be of steam mixed with the products of combustion, and the other energy of steam alone, or one energy of the products of combustion and the other steam. It will be seen therefore that by defining the energies as being of different characters, I wish this to be broadly considered to mean any energies that are of a slightly different form or origin though the differences may be very slight, and I am not limited to the specific energies as herein shown as being produced and characterized as energies of different characters.

The design of the plant contemplates the surrounding of the hot surfaces of the generator with the cooler fluid to be heated by radiation that ordinarily takes place, so no very hot surfaces are exposed. However, the outer surfaces may be if desirable insulated against heat loss in any conventional manner, such for instance as by an asbestos cover, or otherwise.

While the preferred embodiment of the invention has been disclosed and illustrated it will be obviously understood that many other types of engine can be used and that many changes in construction and arrangement of parts may be made without departing from the spirit of the invention.

Having thus described the invention, what I claim is:

1. A generator of the character described having a combustion chamber therein for burning a combustible fuel, said generator also having a fluid chamber adjacent the combustion chamber, means for controlling the passage of a fluid to the fluid chamber and to the combustion chamber whereby a fluid energy of intermixed steam and gaseous products of combustion may be produced in the combustion chamber, or independent separated energies of products of combustion and steam may be produced in said combustion and fluid chambers, and means for carrying said energies from the generator for independent cylinder expansion.

2. A generator of the character described having a combustion chamber for burning a combustible fuel, said generator also having a fluid chamber, means for controlling the passage of a fluid to the fluid chamber in said generator and from the fluid chamber to the combustion chamber whereby energies of a different regulated character are separately produced in said fluid and combustion chambers in the generator, in combination with an engine, and means for carrying said energies to the engine for independent cylinder expansion.

3. A generator of the character described having a combustion chamber for burning a combustible fuel and a fluid chamber in said generator, means for introducing a fluid to the fluid chamber in said generator and from the fluid chamber to the combustion chamber, means for controlling the passage of said fluid to the generator and combustion chamber whereby energies of a different regulated character may be separately produced in said fluid and said combustion chambers, in combination with an engine, and means for carrying said energies to the engine for independent cylinder expansion.

4. A generator of the character described having a combustion chamber for burning a combustible fuel, said generator having a fluid chamber therein, means for controlling the passage of a fluid to said fluid chamber, means for controlling the introduction of a fluid from said fluid chamber to the combustion chamber, and discharge conduits leading from the fluid chamber and the combustion chamber for conveying separate energies from said combustion and fluid chambers to a point of expansion.

5. A generator of the character described having a combustion chamber for burning a combustible fuel, said generator having a fluid chamber therein adjacent the combustion chamber, means for controlling the introduction of fluid from said fluid chamber to the combustion chamber, and discharge conduits leading from the fluid chamber and the combustion chamber, an engine, said conduits communicating with different cylinders of the engine for the purpose described.

6. In a power plant, the combination with a power cylinder, of a generator having a combustion chamber therein and means for introducing a combustible mixture to said combustion chamber, said generator having a fluid chamber, means for introducing a fluid to the fluid chamber in said generator and a controlled quantity of fluid from the fluid chamber to the products of combustion whereby regulated energies of different characters are produced therein, and means connecting the generator with the power cylinder to permit the separate expansion of the energies thus produced.

7. In a power plant, the combination with a plurality of power cylinders, of a generator having a fluid chamber and a combustion chamber and means for introducing a combustible fuel to said combustion chamber, means for controlling the admission of a fluid to the fluid and combustion chambers whereby a composite energy of steam and products of combustion or separated energies of different characters are produced in said fluid and combustion chambers, and means for conveying said energies to the power cylinders for expansion.

8. In a power plant, the combination with a plurality of power cylinders of a generator having separated fluid and combustion chambers therein with a communication between said chambers, and means for introducing and burning a combustible fuel in said combustion chamber, means for controlling the passage of a fluid to the fluid chamber whereby a plurality of separated fluid energies of different characters are produced therein, and means for separately conveying the energies of different characters to different power cylinders for independent expansion.

9. In a power plant, the combination with a plurality of power cylinders of a generator having separate combustion and fluid chambers therein, and means for introducing and burning a combustible fuel in said combustion chamber, means for controlling the passage of a fluid to the fluid chamber of the generator and from said fluid chamber to the combustion chamber whereby a plurality of separated fluid energies of different characters may be produced in the generator, means for separately conveying the energies of different characters to different power cylinders for independent expansion, a radiator, and means for exhausting from certain of said cylinders to the radiator, the exhaust from other cylinders being out of communication with the radiator.

10. A generator of the character described having a combustion chamber for receiving and burning a combustible fuel, said generator having a fluid chamber adjacent the combustion chamber, means for introducing a fluid to said fluid chamber, adjustable means for controlling the introduction of fluid from said fluid chamber to the combustion chamber, in combination with an engine, and independent discharge conduits leading from the fluid chamber and the combustion chamber for conveying the fluids from the combustion and fluid chambers to the engine for expansion.

11. A generator of the character described having a combustion chamber for receiving and burning a combustible fuel, said generator having a fluid chamber, means for introducing fluid to said fluid chamber, a valve for establishing communication between the fluid chamber and the combustion chamber to permit passage of a fluid thereto, a discharge conduit leading from the fluid chamber, and an independent discharge conduit leading from the combustion chamber in combination with an engine in communication with said conduits.

12. A generator for producing fluids for an engine having a combustion chamber for receiving and burning a combustible fuel, said generator having a fluid chamber, means for introducing fluid to said chamber, a valve for establishing communication between the fluid chamber and the combustion chamber to permit passage of a fluid thereto, a discharge conduit leading from the fluid chamber to the engine, an independent discharge conduit leading from the combustion chamber to the engine, and means for opening or closing the discharge conduit leading from the fluid chamber.

13. A generator for supplying pressure fluids for an engine having a combustion chamber for receiving and burning a combustible fuel, a fluid chamber disposed adjacent said combustion chamber, means for introducing a fluid to said fluid chamber, means for controlling the passage of fluid from said fluid chamber to the combustion chamber whereby the same may enter the combustion chamber in a spray, said means permitting the introduction of fluid from the fluid chamber to the combustion chamber to be discontinued, and separate conveying conduits leading from said combustion and fluid chambers to the engine.

14. A generator of the character described comprising a combustion chamber, and an air chamber, of means for feeding air to said chamber, means for feeding fuel to be discharged into the combustion chamber near one end thereof, an air conducting conduit leading from said air chamber at a point remotely of the fuel feed for conveying the air directly through the zone of combustion to be intensely heated by the heat of combustion prior to its discharge into the combustion chamber to intermix with the fuel, said air conducting conduit taking a spiral course through the combustion chamber, and formed with a spray nozzle at one end adapted to discharge the air in a direction opposite to the course of the fuel to cause a complete intermingling thereof and means for conveying the products of combustion from said chamber.

15. In a power plant the combination with a plurality of cylinders, of a generator having a combustion chamber for receiving a combustible fuel, said generator having a fluid chamber therein, means for controlling the introduction of fluid from said chamber to the combustion chamber, and separate discharge conduits leading from said fluid and combustion chambers and in communication with the cylinders.

16. In a power plant the combination with a plurality of power cylinders, of a generator for receiving a combustible fuel and having a combustion chamber, means for controlling the passage of fluid to the generator and the combustion chamber whereby energies of different regulated characters may be produced, and separate means for conveying said energies of different characters to different engine cylinders for independent expansion.

17. The combination with an engine having a water jacket around its cylinder, a radiator, means for conveying water from the radiator to the jacket, a generator, means for introducing a combustible mixture thereto, and adjustable means whereby the water from the water jacket may be permitted to enter the generator or return directly to the radiator without passing to the generator for cooling.

18. The combination with an engine having a water jacket around its cylinder, of a radiator, means for conveying water from the radiator to the water jacket, a generator for producing an energy adjacent said engine, said generator having a combustion chamber and a water chamber therein, means for feeding a combustible mixture to the combustion chamber, and adjustable means for permitting water from the jacket to enter said water chamber, or for closing the passage to said water chamber and compelling the water from the jacket to be returned to the radiator.

19. The combination with a multi-cylinder engine, the cylinders of which have water jackets, of a radiator in communication with said jackets, means for introducing fluid energies of different characters to said cylinders for expansion, and means for conveying exhaust from one of said cylinders to the radiator and for preventing the other cylinder from exhausting into said radiator.

20. The combination with a multi-cylinder engine the cylinders of which have suitable water jackets, of a radiator in communication with said jackets, a generator for producing a combustible mixture, means for introducing a combustible fuel thereto for burning, means for introducing the water from the water jackets to said generator to be subjected to the heat of combustion thereby producing steam, means for conveying the steam thus produced to one of said cylinders for expansion and the products of combustion to another cylinder, and means for conveying the exhaust from one cylinder to the radiator, and for controlling the exhaust from the other cylinder to the atmosphere.

21. The combination with a multi-cylinder engine the cylinders of which have suitable water jackets, of a radiator in communication with said jackets, a generator for producing a combustible mixture, means for introducing a combustible fuel thereto for burning, means for introducing the water from the water jackets to said generator to be subjected to the heat of combustion thereby producing steam, means for conveying the steam thus produced to one of said cylinders for expansion and the products of combustion to another cylinder, and means for conveying the exhaust from one cylinder to the radiator, and for controlling the exhaust from the other cylinder to the atmosphere, said means comprising a suitable exhaust in communication with the radiator and with the atmosphere, and a plurality of valves in said exhaust.

22. The combination with an engine having a water jacket around its cylinder, of a radiator, means for conveying water from the radiator to the jacket, a generator adapted to receive a combustible fuel, means for feeding a combustible fuel to said generator, and adjustable means for controlling the admission of water from the water jacket to said generator for the purpose described.

23. The combination with an engine having a water jacket, of a radiator for communication with said jacket, means for introducing fluid energies of different characters to said engine for expansion, and means for conveying the exhaust products of one energy to the radiator and for preventing the exhaust products of another energy from entering said radiator.

24. In a power plant the combination with a cylinder, of a generator having a combustion chamber and a fluid chamber therein, said combustion chamber being adapted to receive a combustible mixture manually adjustable, means for controlling the introduction of fluid from said fluid chamber to said combustion chamber for producing energies of different characters, and means for permitting the discharge of different energies to the engine for separate expansion.

25. A generator of the character described having a combustion chamber, an air chamber, means for feeding air to said chamber, means for feeding fuel to the combustion chamber, a fluid chamber, said fluid and air chamber one surrounding the other, means for controlling the introduction of fluid from said fluid chamber and to the combustion chamber, and separate discharge conduits from said combustion and fluid chambers.

26. In a power plant, the combination with a cylinder, of a generator having a combustion chamber and a fluid chamber therein, said combustion chamber being adapted to receive a combustible mixture, means for introducing a fluid to said fluid chamber, manually adjustable means for controlling the introduction of fluid from said fluid chamber to said combustion chamber, for producing energies of different characters, and means for permitting the discharge of different energies to the engine for separate expansion.

27. The method of developing power which consists in providing a chamber for heated products of combustion, in conveying a fluid to a zone to be heated by the heat of the products to generate steam separated from said products constituting an energy, in introducing a fluid directly to the products to form therewith an energy of steam and products of combustion, and in introducing to different cylinders for independent expansion the separated energies thus produced.

28. The method of developing power which consists in introducing to a combustion chamber for burning a combustible fuel, in admitting to a zone to be heated by the products of combustion a fluid whereby steam is generated and separated from the products, in introducing a fluid directly to the products to form therewith a composite energy of steam and products of combustion, and in separately expanding the two energies thus produced in an engine.

29. In a power plant, a generator having a chamber for products of combustion, of means for introducing a fluid to be heated by the products to generate steam separated from said products, means for introducing a fluid to the products of combustion to form therewith an energy consisting of the products of combustion and steam, an engine, and means for introducing the composite energy of the products of combustion and steam and the energy of steam alone to the engine for separate cylinder expansion.

30. In a power plant, a generator having a combustion chamber for receiving a combustible fuel, of means for introducing a fuel to be heated by the products of combustion to generate steam separated from the products, means for introducing a fluid directly to the products for producing therewith a composite energy, and means for conveying the two energies thus produced to an engine for independent cylinder expansion.

31. A power plant comprising a generator having a chamber for gaseous products of combustion, means for feeding a fluid into a zone of heat for the absorption of heat from said products to generate steam separated therefrom, means permitting a fluid to directly mix with the products to form therewith a composite energy, an engine, and means permitting a separate expansion of the energies produced in the generator.

32. A generator having a combustion chamber for receiving a combustible fuel, means for feeding a fluid into a zone to absorb heat from the products of combustion producing a separated energy of steam, means permitting a fluid to directly enter the products of combustion to form therewith a composite energy, an engine, and means permitting an independent expansion of the energies thus produced.

33. In a power plant, the combination with a plurality of power cylinders, of a generator having a combustion chamber and means for introducing a combustible fuel thereto, said generator having a fluid chamber, means for feeding a fluid to the fluid chamber to absorb heat from the products of combustion and generate steam separated from said products, adjustable means for regulating the quantity of fluid introduced to the products of combustion to produce therewith a composite energy of steam and products in the combustion chamber, and means connecting the generator with the power cylinders to permit a separate expansion of the steam and products of combustion in different engine cylinders.

34. In a power plant, the combination with a plurality of power cylinders, of a generator having separate communicating fluid and combustion chambers, of means for introducing a fuel to the combustion chamber, means for introducing a fluid to the fluid chamber, said fluid and combustion chambers being constructed to produce separated energies of steam and products of combustion and an energy consisting of steam alone, and means permitting a separate expansion of the energies thus produced in different power cylinders.

35. In a power plant, the combination with a plurality of power cylinders, of a generator having a combustion chamber and means for introducing a combustible fuel thereto, said generator having a fluid chamber, means for feeding a fluid to the fluid chamber to absorb heat from the products of combustion and generate steam separated from said products and for delivering fluid to the combustion chamber, adjustable means for regulating the quantity of fluid introduced to the products of combustion to produce therewith a composite energy of steam and products in the combustion chamber, and means connecting the generator with the power cylinders to permit a separate expansion of the steam and products of combustion in different engine cylinders.

36. In a power plant, the combination with an engine, of a generator, means for introducing a combustible fuel to the generator, means for introducing a fluid to said generator to absorb heat from the products of combustion producing a steam, means for introducing a fluid directly to the products to form therewith a composite energy of steam and products of combustion, and means for separately expanding the energies thus produced.

37. A generator of the character described having a combustion chamber and an air chamber, means for feeding air to said air chamber and for feeding fuel to the combustion chamber, a fluid chamber adjacent the air chamber, means for feeding a fluid to said fluid chamber to be heated therein to generate steam, means for controlling the introduction of a quantity of fluid from said fluid chamber to the combustion chamber, and means for independently discharging from said fluid and combustion chambers.

38. The combination with a multi-cylinder engine, of a generator having a combustion chamber therein adapted to be supplied with air from one of said cylinders which constitutes an air compressor, said generator having a fluid chamber adjacent said combustion chamber, means for introducing a fluid to said fluid chamber where a quantity of the fluid is evaporated, means for controlling the passage of a regulated quantity of the fluid from the fluid chamber to the combustion chamber, means for introducing a fuel to the combustion chamber, and separate energy conducting conduits extending from said fluid and combustion chambers to different cylinders of the engine whereby the independent motive fluids may be separately conveyed to said cylinders for independent expansion.

39. The combination with an engine having a water jacket, a radiator, means for conveying water from the radiator to the jacket, a fluid pressure generator, means for introducing fuel thereto, means for controlling the admission of water from the engine jacket to the generator for the production of steam from heat absorbed from the products of combustion, and means for expanding said products of combustion and steam in the engine, and means for shunting the water supply from the generator to return the same directly to the radiator.

40. In a power plant, the combination with an engine, of a generator having a combustion chamber for receiving a combustible fuel, said generator having a fluid chamber, means for controlling the introduction of fluid to said chamber and from the fluid chamber to the combustion chamber, and conduits leading from the fluid and combustion chamber in communication with the engine for the independent expansion of energies produced in the generator.

41. The combination with a multi-cylinder engine, of a generator having a combustion chamber therein, said generator having an air chamber, and a fluid chamber, one surrounding the other, means for introducing fuel to the combustion chamber, means for introducing air from one of the engine cylinders to the combustion chamber, means for controlling the passage of fluid and air from the fluid and air chambers to the combustion chamber to produce a composite energy, and means for conveying the composite energy of steam and gaseous products of combustion and the energy of steam alone to the engine cylinders for separate expansion.

42. The combination with an engine having a water jacket, a radiator, means for conveying water from the radiator to the jacket, a generator, means for introducing a combustible mixture thereto, and means for controlling the passage of water from the water jacket to the generator whereby controlled quantities of water are admitted to the generator to produce a composite energy of a variable temperature and pressure or the supply of water returned directly from the jacket to the radiator without passing to the generator.

43. A generator of the character described having a combustion chamber, an air chamber surrounding the combustion chamber, a communication between the air chamber and the combustion chamber, a water chamber surrounding the air chamber, a communication between the water chamber and the combustion chamber, and separate discharge conduits leading from said water and combustion chamber.

44. The method of producing power which consists in introducing to a generator a combustible mixture to produce expansive products of combustion, in mixing with said gaseous products of combustion preheated water to be converted into steam forming a composite energy, in expanding the composite energy in an engine, in jacketing the engine and in introducing water to the jacket to be heated by heat absorbed from the expanding composite energy introduced thereto, and in storing the water in a chamber in the generator from where it is introduced to the combustion chamber.

In testimony whereof I hereunto affix my signature in the presence of two witnesses.

WALTER E. TRENT.

Witnesses:
C. M. Thomas,
C. B. Bull.